(12) United States Patent
Motoda (10) Patent No.: US 9,402,022 B2
(45) Date of Patent: Jul. 26, 2016

(54) IMAGING APPARATUS WITH FOCUS ASSIST FUNCTION

(71) Applicant: Panasonic Intellectual Property Management Co., Ltd., Osaka (JP)

(72) Inventor: Kazumasa Motoda, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 14/594,756

(22) Filed: Jan. 12, 2015

(65) Prior Publication Data

US 2016/0028937 A1   Jan. 28, 2016

(30) Foreign Application Priority Data

Jul. 23, 2014   (JP) ................................. 2014-149645

(51) Int. Cl.
*H04N 5/232*   (2006.01)

(52) U.S. Cl.
CPC ................................ *H04N 5/23212* (2013.01)

(58) Field of Classification Search
USPC .................................................. 348/349, 252
See application file for complete search history.

(56) References Cited

FOREIGN PATENT DOCUMENTS

JP   2006-108973   4/2006

*Primary Examiner* — Joel Fosselman
(74) *Attorney, Agent, or Firm* — Renner, Otto, Boisselle & Sklar, LLP (57) ABSTRACT

An imaging apparatus with a focus assist (FA) function includes an imager configured to obtain an image signal from a subject formed by a lens, a high-frequency signal extractor configured to extract a high-frequency signal from the image signal, a modulation level calculator configured to determine a magnitude of a modulation level signal in each of regions, into which a screen of the image signal is divided, in accordance with an amplitude level of the high-frequency signal, a level modulator configured to modulate an amplitude level of the high-frequency signal using the modulation level signal to obtain an FA signal, and an FA signal synthesizer configured to synthesize the FA signal with the image signal to output a resultant signal.

6 Claims, 11 Drawing Sheets

FIG. 1

FIG. 2A  IMAGE SIGNAL S1

FIG. 2B  HIGH-FREQUENCY SIGNAL S2

FIG. 2C  FULL-WAVE RECTIFICATION SIGNAL S3

FIG. 2D  HALF-WAVE RECTIFICATION SIGNAL S4

FIG. 2E  INTERPOLATED MODULATION LEVEL SIGNAL S5

FIG. 2F  FA SIGNAL S6

FIG. 3

| | | | | | | | |
|---|---|---|---|---|---|---|---|
| ⊘1.0 | ⊘1.3 | ⊘1.0 | ⊘1.0 | ⊘1.0 | ⊘0.8 | ⊘3.2 | ⊘0.8 |
| ⊘1.2 | ⊘2.6 | ⊘5.0 | ⊘3.0 | ⊘2.8 | ⊘1.0 | ⊘1.0 | ⊘1.2 |
| ⊘1.7 | ⊘2.4 | ⊘6.5 | ⊘5.0 | ⊘3.2 | ⊘4.5 | ⊘1.5 | ⊘1.1 |
| ⊘2.2 | ⊘2.8 | ⊘2.4 | ⊘3.0 | ⊘5.0 | ⊘4.8 | ⊘2.4 | ⊘1.6 |
| ⊘2.5 | ⊘1.2 | ⊘1.6 | ⊘2.6 | ⊘2.5 | ⊘1.5 | ⊘1.6 | ⊘1.2 |

FIG. 8A  HALF-WAVE RECTIFICATION SIGNAL

FIG. 8B  CONSTANT MODULATION LEVEL SIGNAL (HIGHER)

FIG. 8C  FA SIGNAL

→ TIME

FIG. 9A  HALF-WAVE RECTIFICATION SIGNAL

FIG. 9B  CONSTANT MODULATION LEVEL SIGNAL (LOWER)

FIG. 9C  FA SIGNAL

IMAGING APPARATUS WITH FOCUS ASSIST FUNCTION

CROSS-REFERENCE TO RELATED APPLICATION

This application claims priority to Japanese Patent Application No. 2014-149645 filed on Jul. 23, 2014, the entire disclosure of which is incorporated by reference herein.

BACKGROUND

The present disclosure relates to imaging apparatuses with a focus assist (FA) function which aids manual focusing by highlighting high-frequency components of an image.

Japanese Unexamined Patent Publication No. 2006-108973 shows providing a two-dimensional graphical illustration of a histogram of high-frequency components of an image signal. The user can recognize a perfect focus position in manual focus based on variations of the histogram illustrated.

SUMMARY

The present disclosure provides an imaging apparatus with an FA function in which high-frequency components that are highlighted are less likely to be affected by a brightness difference and difference of fineness in a pattern in an image.

The imaging apparatus with the FA function according to the present disclosure includes an imager configured to obtain an image signal from a subject formed by a lens, a high-frequency signal extractor configured to extract a high-frequency signal from the image signal, a modulation level calculator configured to determine a magnitude of a modulation level signal in each of regions, into which a screen of the image signal is divided, in accordance with an amplitude level of the high-frequency signal, a level modulator configured to modulate the amplitude level of the high-frequency signal using the modulation level signal to obtain an FA signal, and an FA signal synthesizer configured to synthesize the FA signal with the image signal to output a resultant signal.

The imaging apparatus with the FA function in the present disclosure determines the magnitude of the modulation level signal in accordance with the amplitude level of the high-frequency signal. Therefore, the apparatus is useful to reduce an effect on high-frequency components that are highlighted due to a brightness difference and difference of fineness in a pattern in an image.

DETAILED DESCRIPTION

Embodiments are described in detail below with reference to the attached drawings. However, unnecessarily detailed description may be omitted. For example, detailed description of well known techniques or description of the substantially same elements may be omitted. Such omission is intended to prevent the following description from being unnecessarily redundant and to help those skilled in the art easily understand it.

The inventor provides the following description and the attached drawings to enable those skilled in the art to fully understand the present disclosure. Thus, the description and the drawings are not intended to limit the scope of the subject matter defined in the claims.

First Embodiment 1-1. Configuration

Figure 1:
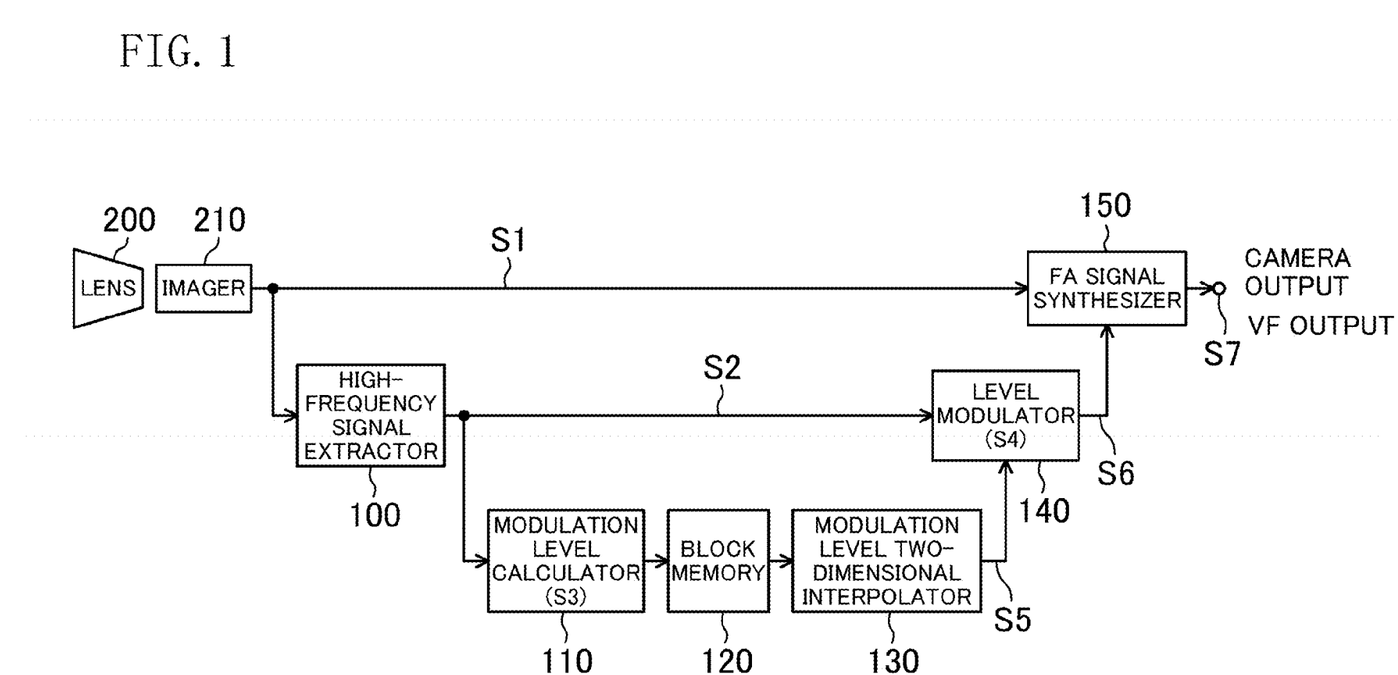
FIG. 1 is a block diagram showing a configuration of an imaging apparatus with an FA function in a first embodiment.

FIG. 1 is a block diagram showing a configuration of an imaging apparatus with an FA function in a first embodiment. FIGS. 2A-2F illustrate examples signal waveforms in the imaging apparatus of FIG. 1, and the first half and the second half of the time axis respectively show a dark image and a bright image.

The imaging apparatus in FIG. 1 includes a lens 200, an imager 210, a high-frequency signal extractor 100, a modulation level calculator 110, a block memory 120, a modulation level two-dimensional interpolator 130, a level modulator 140, and an FA signal synthesizer 150.

Figures 2A, 2B, 2C:
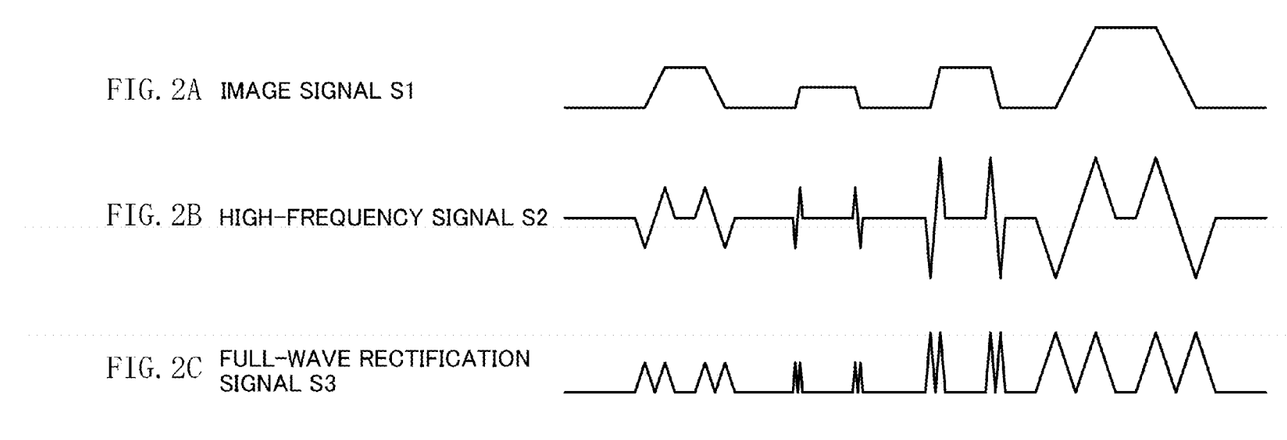
FIGS. 2A-2F show examples of signal waveforms in the imaging apparatus of FIG. 1.

The imager 210 obtains an image signal S1 as shown in FIG. 2A from a subject formed by the lens 200.

The high-frequency signal extractor 100 extracts a high-frequency signal S2 from the image signal S1. For example, the high-frequency signal extractor 100 obtains a high-frequency signal S2 as shown in FIG. 2B by performing secondary differentiation of the image signal S1. Specifically, the high-frequency signal S2 refers to a signal representing the contour of the subject captured through the lens 200.

The modulation level calculator 110 determines the magnitude of a modulation level signal in each of regions, into which the screen of the image signal S1 is divided, in accordance with the amplitude level of the high-frequency signal S2. For example, the modulation level calculator 110 obtains a full-wave rectification signal S3, representing the absolute value of the high-frequency signal S2, as shown in FIG. 2C, produces a histogram of the amplitude level of the full-wave rectification signal S3 in each of the divided regions, and determines the magnitude of the modulation level signal in accordance with a cumulative frequency of the histogram.

The block memory 120 temporarily memorizes the modulation level signal, which is determined by the modulation level calculator 110, of each of the regions.

The modulation level two-dimensional interpolator 130 two-dimensionally interpolates the modulation level signal of each of the regions, which is temporarily memorized in the block memory 120, across the entire screen.

Figure 2D:
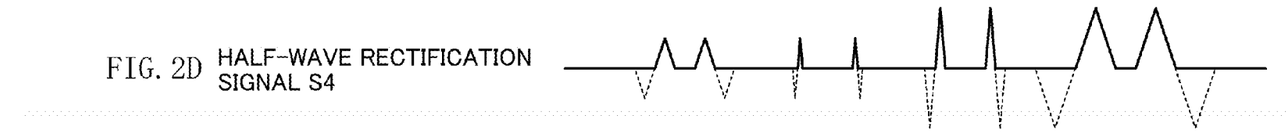
Figure 2E:
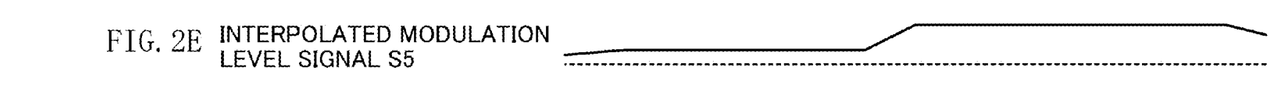
Figure 2F:
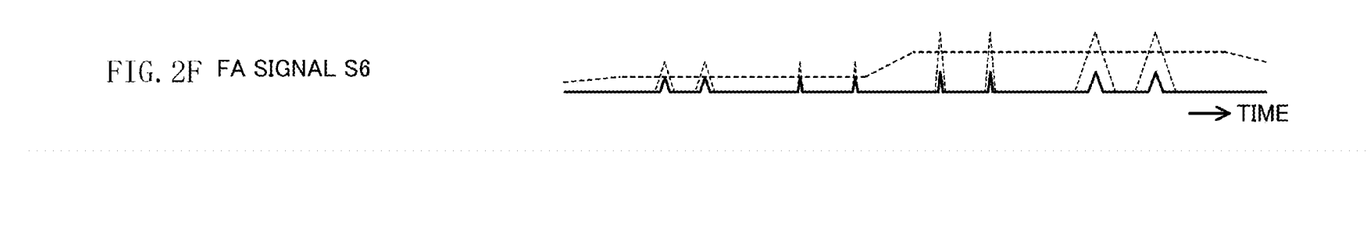

The level modulator 140 modulates the amplitude level of the high-frequency signal S2 using the modulation level signal S5, which is interpolated, to obtain an FA signal S6. For example, the level modulator 140 obtains a half-wave rectification signal S4 as shown in FIG. 2D from the high-frequency signal S2, and performs a coring process for the amplitude level of the half-wave rectification signal S4 using the modulation level signal S5, which is interpolated as shown in FIG. 2E, as a continuously varying threshold value, thereby obtaining an FA signal S6 as shown in FIG. 2F. Here, the coring process refers to a process performed such that an amplitude level equal to or less than a threshold value is made zero, and is a typical noise removal process.

The FA signal synthesizer 150 synthesizes the FA signal S6 with the image signal S1 to obtain an output signal S7 as a camera output and view finder (VF) output.

1-2. Operation

Figure 3:
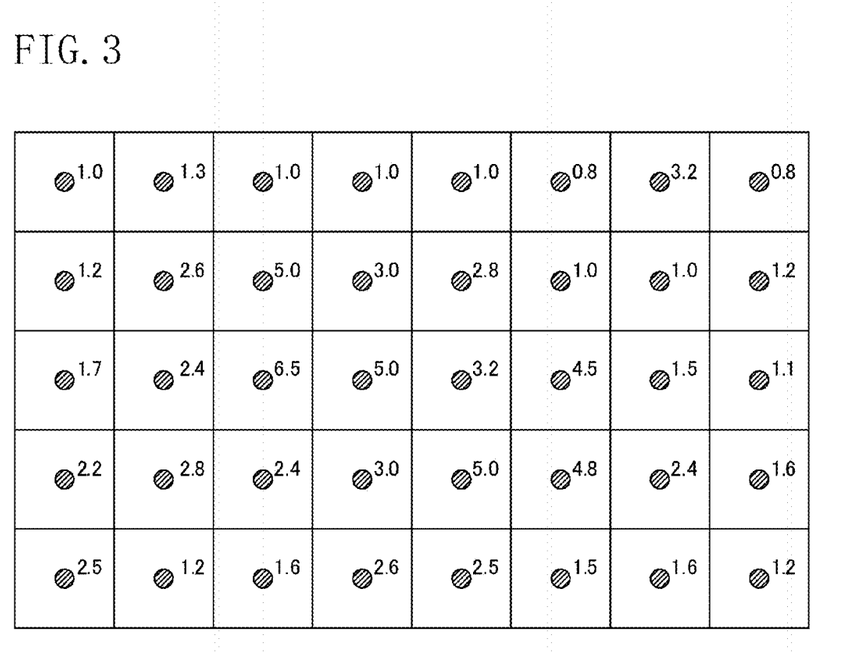
FIG. 3 shows examples of magnitudes of modulation level signals determined by a modulation level calculator in FIG. 1, and representing respective regions.

FIG. 3 shows examples of magnitudes of modulation level signals determined by the modulation level calculator 110 in FIG. 1, and representing respective regions. Each of the region is, e.g., a 64×64 pixel region. For example, "1.0" shown in one of the regions located at the upper left corner in FIG. 3 means that a representative modulation level signal of the region of the 4096 pixel region has a magnitude of 1.0.

Figure 4A:
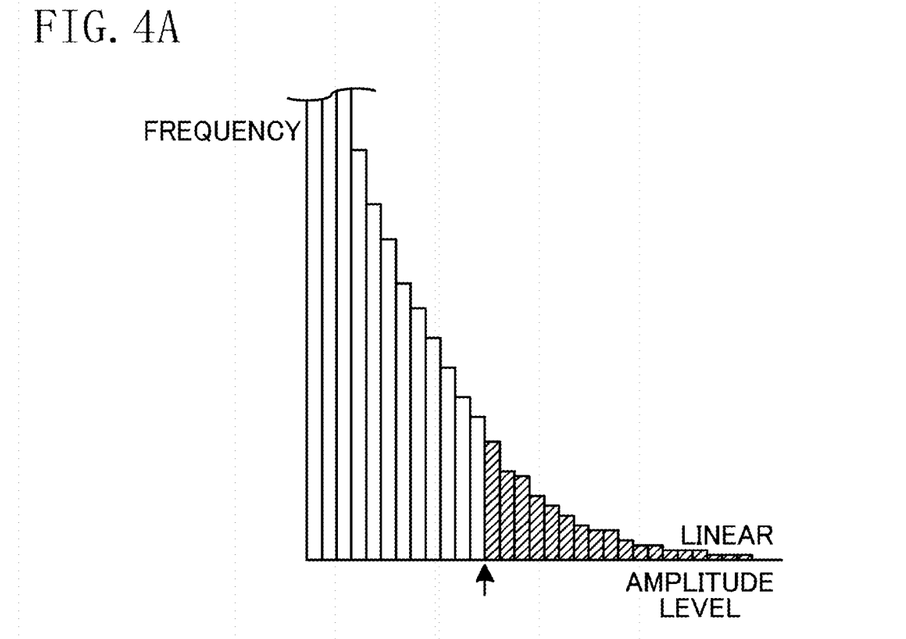
FIG. 4A shows an example of a histogram produced in each of the regions by the modulation level calculator in FIG. 1.

FIG. 4A shows an example of a histogram produced in each of the regions by the modulation level calculator 110 in FIG. 1. The modulation level calculator 110 produces a histogram of the amplitude level of the full-wave rectification signal S3 in each of the regions, and adopts the amplitude level at which the cumulative frequency (cumulative number of pixels) accumulated from a higher amplitude level of the histogram reaches a predetermined cumulative frequency as the magnitude of the modulation level signal representing the region. Here, non-linear conversion described below is not performed with respect to the full-wave rectification signal S3. In the example shown in FIG. 4A, a hatched area corresponds to the predetermined cumulative frequency, and the amplitude level indicated by the arrow corresponds to the magnitude of the modulation level signal representing the region.

Figure 4B:
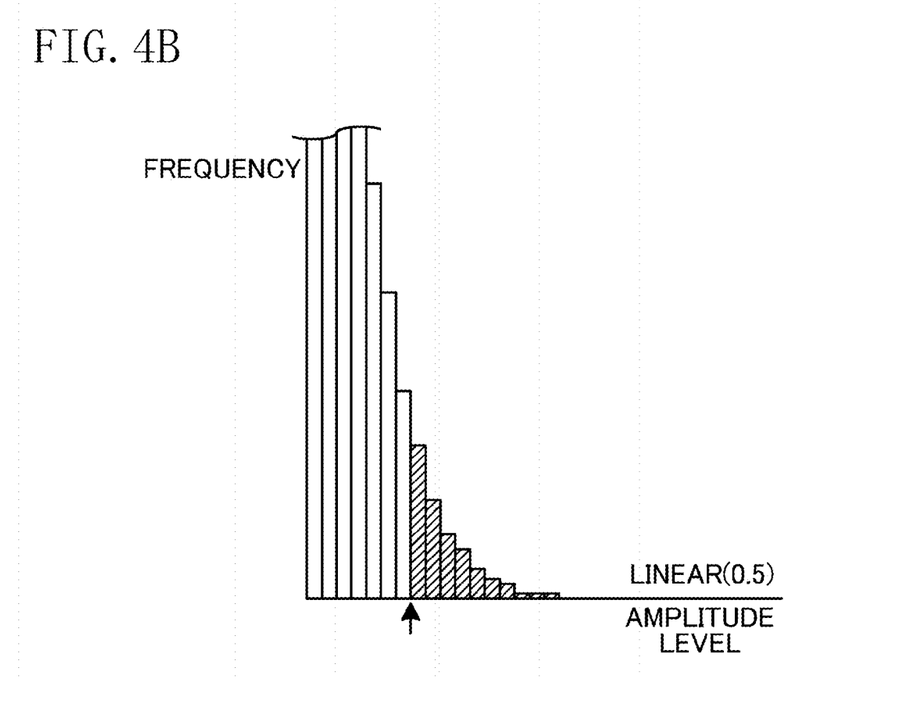
FIG. 4B shows an example of the histogram when the image has, e.g., an brightness half of that in FIG. 4A.

FIG. 4B shows the histogram when the image has, e.g., a brightness half of that in FIG. 4A. The hatched area corresponds to a predetermined cumulative frequency, and the amplitude level indicated by the arrow corresponds to the magnitude of the modulation level signal representing the region. Thus, in the case of a dark image, the modulation level calculator 110 determines the magnitude of the modulation level signal that is smaller than that in the case shown in FIG. 4A.

When the entire image is a bright image or fine patterns are in focus and the image includes many high-frequency components, the histogram shows a wide distribution up to a higher amplitude level, as shown in FIG. 4A. Conversely, when the entire image is a dark image or the image is not in focus, the histogram is biased toward a lower amplitude level, as shown in FIG. 4B. In this way, the high-frequency components highlighted for aiding focusing are affected by the brightness difference and difference of fineness in the pattern in the image. Therefore, it has conventionally been difficult to manually focus a high-resolution image.

However, in the embodiment, the modulation level calculator 110 determines the magnitude of the modulation level signal based on the cumulative frequency. Therefore, in the case of many high-frequency components as shown in FIG. 4A, a modulation level signal having a larger magnitude is obtained. In the case of less high-frequency components as shown in FIG. 4B, a modulation level signal having a smaller magnitude is obtained. Thus, by obtaining and use of features of patterns and local features of brightness in each of the regions, the imaging apparatus can obtain a modulation level signal associated with the amplitude level of the high-frequency signal in each of the regions.

Figure 5:
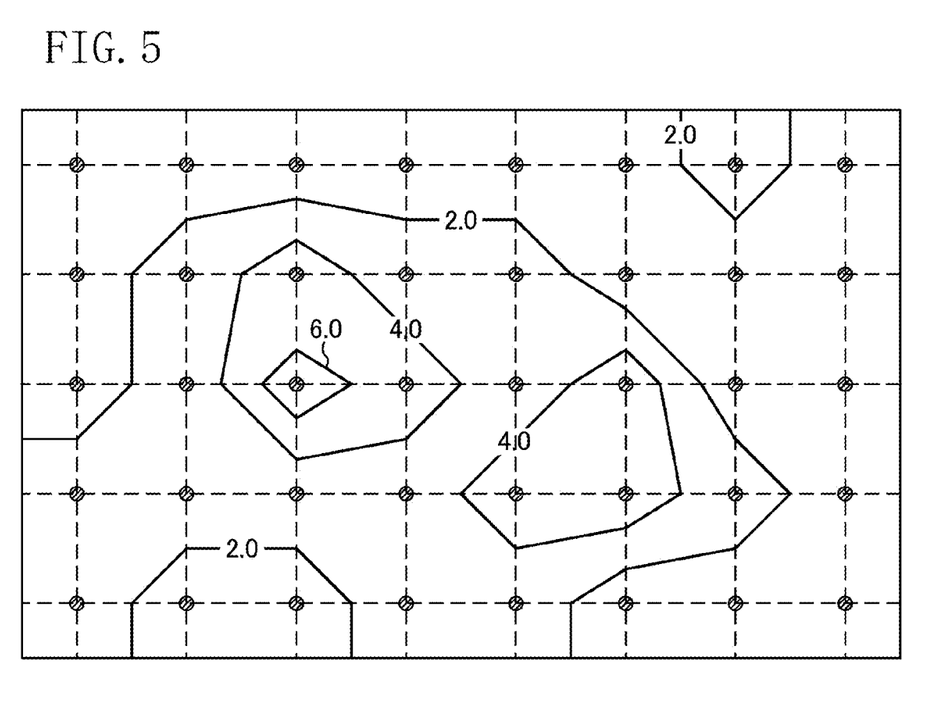
FIG. 5 shows a result, in contour form, of two-dimensional interpolation of the modulation level signal implemented by a modulation level two-dimensional interpolator in FIG. 1 based on the example of FIG. 3.

FIG. 5 shows a result, in contour form, of two-dimensional interpolation of the modulation level signals implemented by the modulation level two-dimensional interpolator 130 in FIG. 1 based on the example of FIG. 3. Circles in FIG. 5 respectively correspond to circles in FIG. 3. A magnitude in each one pixel is obtained by interpolation based on the magnitude in each 4096 pixel region shown in FIG. 3. The waveform of the modulation level signal S5, which is interpolated, shown in FIG. 2E is a signal waveform obtained in such a manner.

The level modulator 140 performs a coring process for the amplitude level of the half-wave rectification signal S4 shown in FIG. 2D with the modulation level signal S5, which is interpolated, shown in FIG. 2E, as a threshold value, thereby obtaining the FA signal S6 as shown in FIG. 2F. As a result, the amplitude level of the FA signal S6 is substantially constant regardless of the brightness of the image.

Examples of the synthesizing method in the FA signal synthesizer 150 include a method of adding a single color signal of which gradation corresponds to the amplitude level of the FA signal S6 into a monochromatized signal S1, a method of substituting the FA signal S6 for a part of the image signal S1, and a method of only showing the FA signal S6.

Figure 6A:
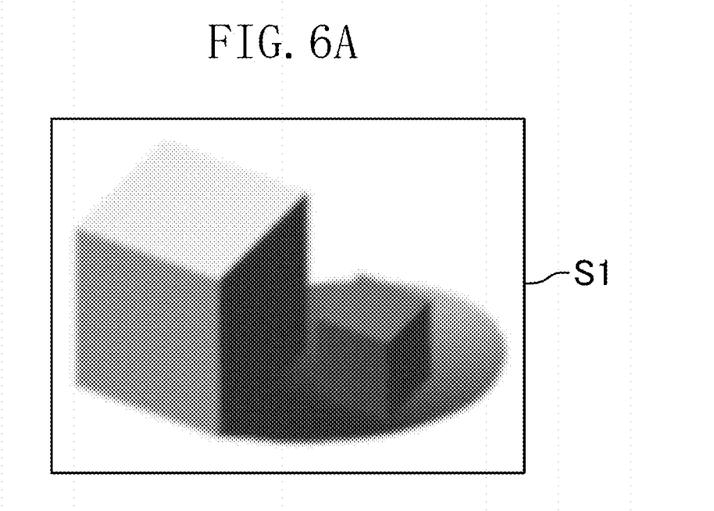
FIG. 6A shows an example of a screen of an image signal when a subject is not in focus.
Figure 6B:
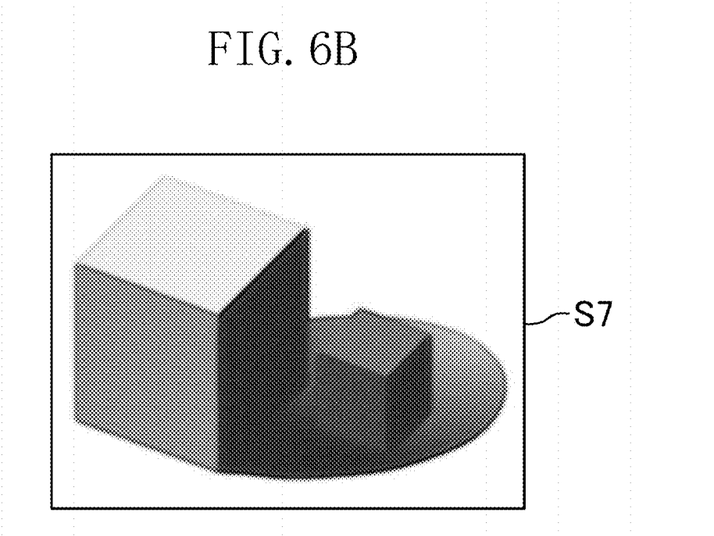
FIG. 6B shows an example of a screen of an output signal obtained by synthesizing an FA signal with the image signal by the imaging apparatus of FIG. 1.

FIG. 6A shows an example of a screen of an image signal S1 when a subject is not in focus, and FIG. 6B shows an example of a screen of an output signal S7 obtained by synthesizing an FA signal S6 with the image signal S1 by the imaging apparatus of FIG. 1. In FIG. 6B, the contour of a part of the subject that is not in focus is shown in pale-colored line.

Figure 7A:
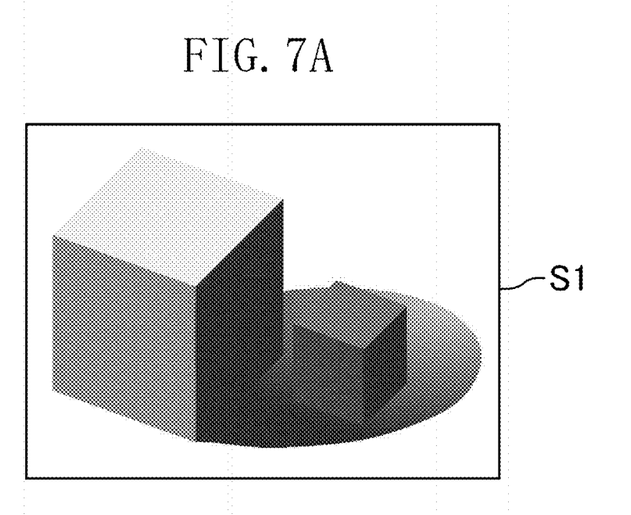
FIG. 7A shows an example of a screen of an image signal when a subject is in focus.
Figure 7B:
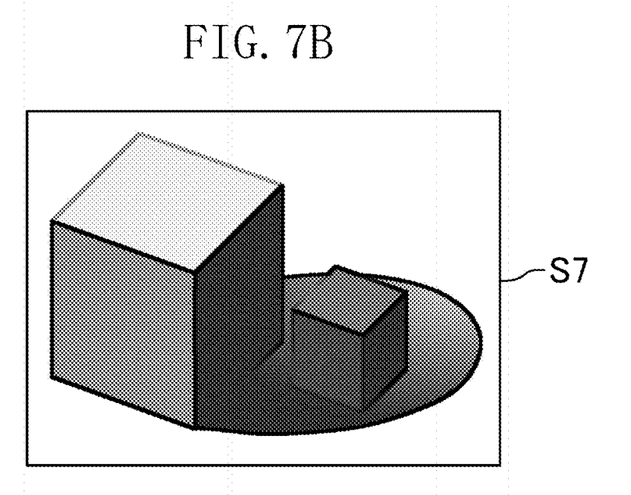
FIG. 7B shows an example of a screen of an output signal obtained by synthesizing an FA signal with the image signal by the imaging apparatus of FIG. 1.

FIG. 7A shows an example of a screen of an image signal S1 when a subject is in focus, and FIG. 7B shows an example of a screen of an output signal S7 obtained by synthesizing an FA signal S6 with the image signal S1 by the imaging apparatus of FIG. 1. In FIG. 7B, the contour of a part of the subject that is in focus is shown in deep-colored line, and the contour of a part of the subject that is not in focus is shown in pale-colored line. The contour of the part of the subject that is in focus is shown in deep-colored line even if it is a dark, shaded part. This makes it easier to manually focus the image.

1-3. Advantages

Figures 8A, 8B, 8C:
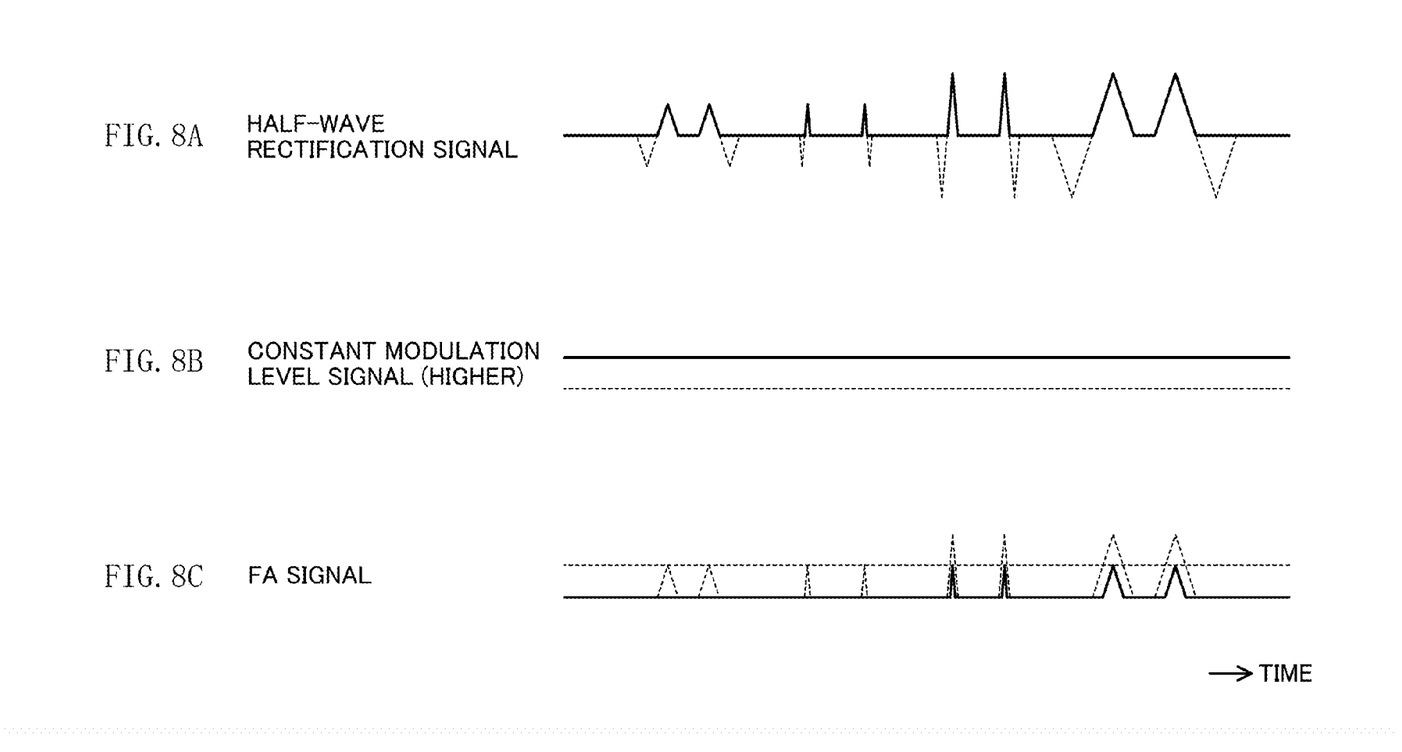
FIGS. 8A-8C show signal waveforms in comparative example 1 in which the modulation level signal has a constant value of a higher level, and correspond to FIGS. 2D-2F.

FIGS. 8A-8C show signal waveforms in comparative example 1 in which the modulation level signal has a constant value of a higher level, and correspond to FIGS. 2D-2F. In comparative example 1, the FA signal disappears in a dark image part corresponding to the first half of the time axis, as shown in FIG. 8C.

Figure 9A:
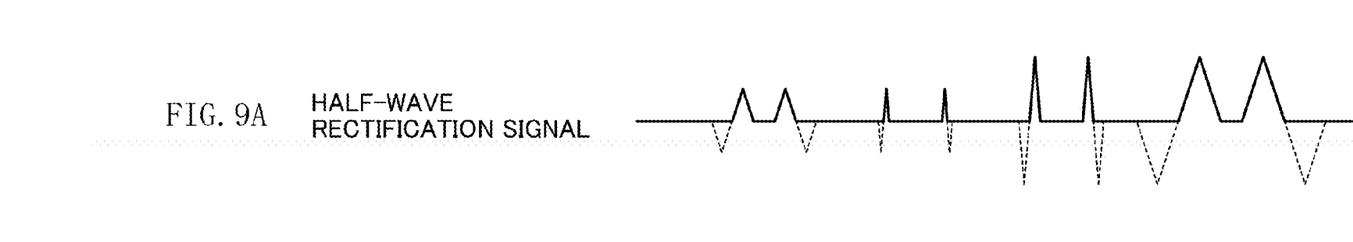
FIGS. 9A-9C show signal waveforms in comparative example 2 in which the modulation level signal has a constant value of a lower level, and correspond to FIGS. 2D-2F.
Figure 9B:
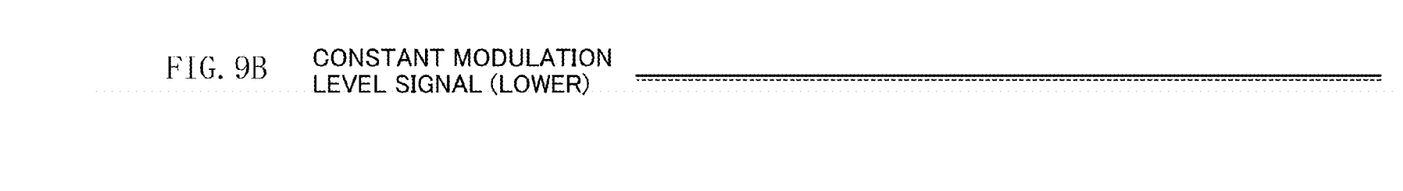
Figure 9C:
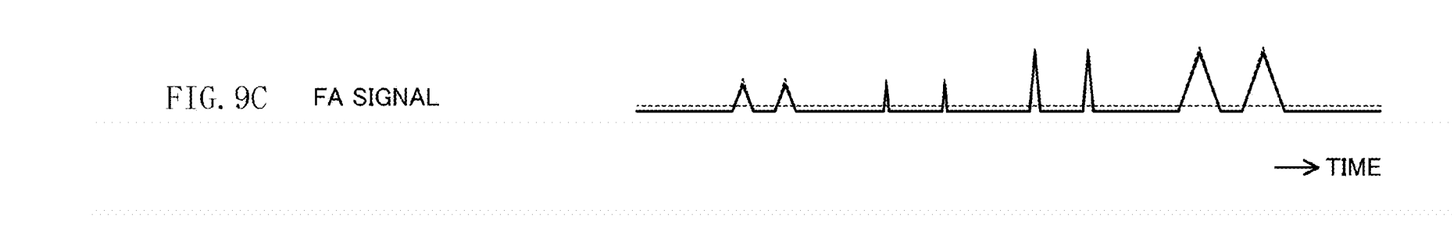

FIGS. 9A-9C show signal waveforms in comparative example 2 in which the modulation level signal has a constant value of a lower level, and correspond to FIGS. 2D-2F. In comparative example 2, variation occurs in the amplitude level of the FA signal, as shown in FIG. 9C.

In contrast, according to the embodiment, the magnitude of the modulation level signal S5 varies, in accordance with the amplitude level of the high-frequency signal S2, as shown in FIG. 2E, thereby making the amplitude level of the FA signal S6 substantially constant as shown in FIG. 2F. Therefore, the FA signal S6 is stably shown, thereby making it easier to manually focus the image.

As described above, the imaging apparatus with the FA function according to the embodiment includes the imager 210 configured to obtain an image signal from a subject formed by the lens 200, the high-frequency signal extractor 100 configured to extract a high-frequency signal from the image signal, the modulation level calculator 110 configured to determine the magnitude of a modulation level signal in each of regions, into which a screen of the image signal is divided, in accordance with the amplitude level of the high-frequency signal, the level modulator 140 configured to obtain an FA signal by modulating the amplitude level of the high-frequency signal using the modulation level signal, and the FA signal synthesizer 150 configured to synthesize the FA signal with the image signal to output a resultant signal.

With this configuration, the magnitude of the modulation level signal is determined in accordance with the amplitude level of the high-frequency signal. Therefore, the high-frequency components that are highlighted are less likely to be affected by a brightness difference and difference of fineness in the pattern in the image.

According to the imaging apparatus with the FA function in the embodiment, the modulation level calculator 110 produces a histogram of the amplitude level of the high-frequency signal in each of the divided regions to determine the magnitude of the modulation level signal according to the cumulative frequency of the histogram. Specifically, the modulation level calculator 110 adopts the amplitude level at which the cumulative frequency accumulated from a higher amplitude level of the histogram reaches a predetermined cumulative frequency as the magnitude of the modulation level signal representing the region.

The configuration advantageously determines the magnitude of the modulation level signal automatically and properly in accordance with the amplitude level of the high-frequency signal. An average value of the amplitude level of the high-frequency signal may be calculated in each of the regions without producing the histogram to determine the magnitude of the modulation level signal in accordance with the average value.

The imaging apparatus with the FA function according to the embodiment further includes a modulation level two-dimensional interpolator 130 between the modulation level calculator 110 and the level modulator 140, the modulation level two-dimensional interpolator 130 being configured to perform two-dimensional interpolation of the modulation level signal in each of the regions. The imaging apparatus further includes a block memory 120 between the modulation level calculator 110 and the modulation level two-dimensional interpolator 130, the block memory 120 configured to temporarily memorize the modulation level signal in each of the regions.

This configuration can reduce the amount of calculations when an FA signal is generated from the high-frequency signal. If the magnitude of the modulation level signal is determined in each one pixel based on high-frequency components within a predetermined size region including the one pixel, the amount of the required calculations is increased whereas the block memory 120 and the modulation level two-dimensional interpolator 130 can be omitted.

According to the imaging apparatus with the FA function of the embodiment, the level modulator 140 performs a coring process for the amplitude level of the high-frequency signal using the modulation level signal as a continuously varying threshold value, thereby obtaining an FA signal.

With this configuration, the amplitude level of the FA signal is substantially constant regardless of brightness and fineness of the image.

Second Embodiment 2-1. Configuration

Figure 10:
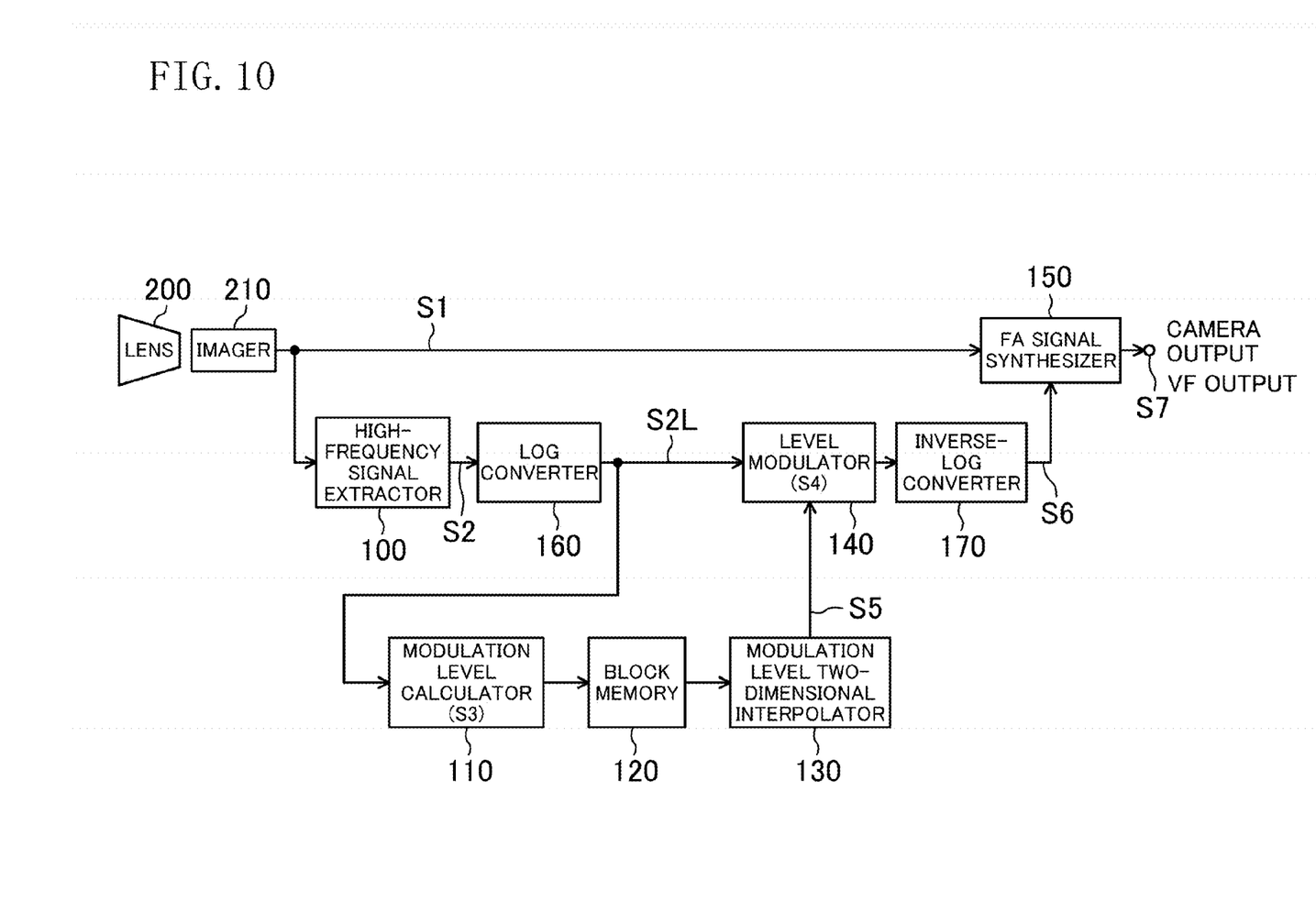
FIG. 10 is a block diagram showing a configuration of an imaging apparatus with an FA function in a second embodiment.

FIG. 10 a block diagram showing a configuration of an imaging apparatus with an FA function in a second embodiment. The imaging apparatus in FIG. 10 further includes, in addition to the elements in FIG. 1, a logarithm ("LOG") converter 160 and an inverse-logarithm ("inverse-LOG") converter 170.

The LOG converter 160 performs LOG conversion of the absolute value of a high-frequency signal S2 obtained by the high-frequency signal extractor 100 and supplies a high-frequency signal S2L obtained by the LOG-conversion to the modulation level calculator 110 and the level modulator 140. For example, the LOG converter 160 receives the high-frequency signal S2, and divides the signal S2 into sign and magnitude parts to independently process these parts. If the magnitude part is one or less, the output is zero. If the magnitude part is more than one, the result of the LOG conversion and the sign part are output together.

The inverse-LOG converter 170 performs inverse-LOG conversion of an FA signal from the level modulator 140, and supplies the FA signal S6 obtained by the inverse-LOG conversion to an FA signal synthesizer 150.

2-2. Operation

The main operation in the second embodiment is almost the same as that in the first embodiment, except determining the magnitude of the modulation level signal based on a histogram of the amplitude level of the high-frequency signal S2L obtained by the LOG-conversion, and performing inverse-LOG conversion of the resultant signal obtained from the process by the level modulator 140.

Figure 11A:
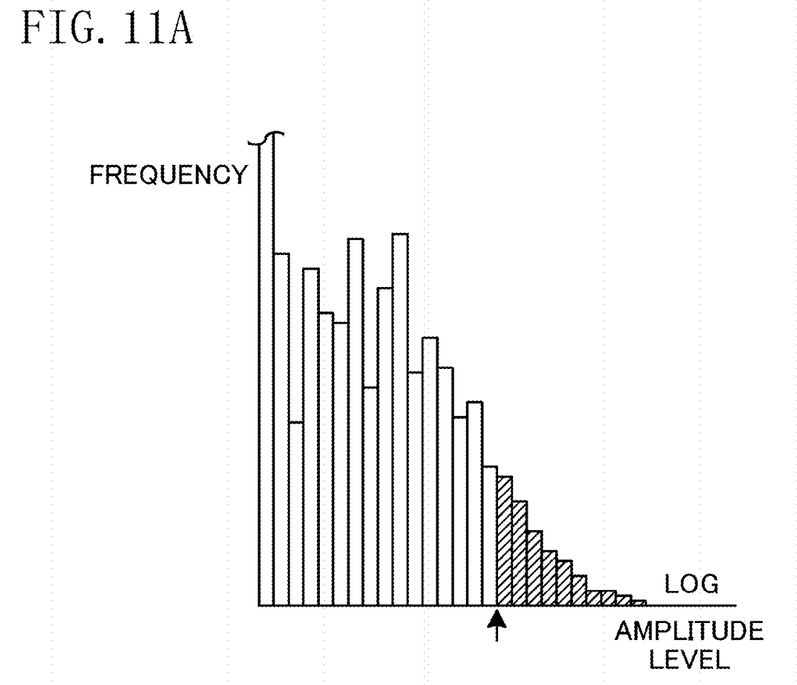
FIG. 11A shows an example of a histogram produced in each of the regions by a modulation level calculator in FIG. 10.

FIG. 11A shows an example of a histogram produced in each of the regions by the modulation level calculator 110 in FIG. 10. The modulation level calculator 110 produces a histogram of the amplitude level in each of the regions based on the high-frequency signal S2L obtained by the LOG-conversion, and adopts the amplitude level at which the cumulative frequency accumulated from a higher amplitude level of the histogram reaches a predetermined cumulative frequency as the magnitude of the modulation level signal representing the region. In the example of FIG. 11A, a hatched area corresponds to the predetermined cumulative frequency, and the amplitude level indicated by the arrow corresponds to the magnitude of the modulation level signal representing the region.

Figure 11B:
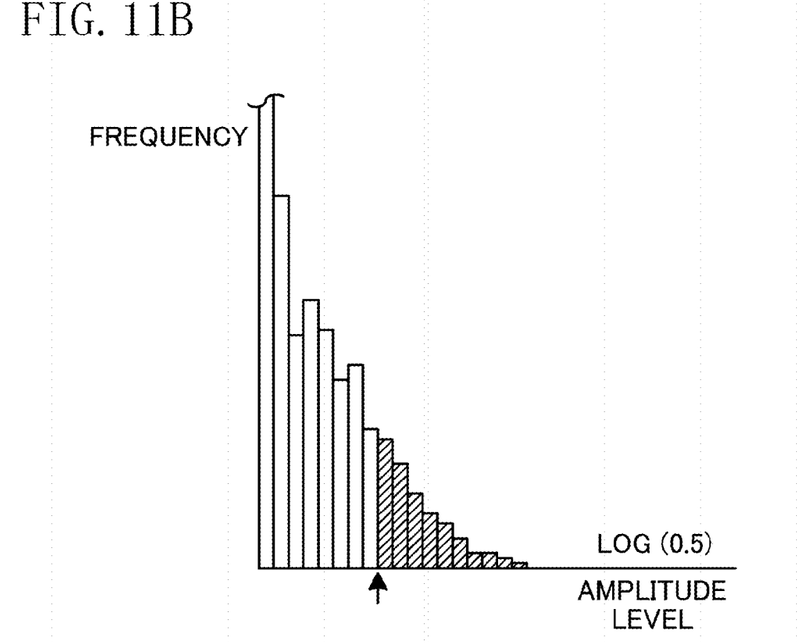
FIG. 11B shows an example of the histogram when the image has, e.g., a brightness half of that in FIG. 11A.

FIG. 11B shows the histogram when the image has, e.g., a brightness half of that in FIG. 11A. The hatched area corresponds to a predetermined cumulative frequency, and the amplitude level indicated by the arrow corresponds to the magnitude of the modulation level signal.

Even if the brightness of the subject is changed, the profile of the histogram of the amplitude level after the LOG conversion of the high-frequency signal S2 is not significantly changed. For example, if the image having the histogram as shown in FIG. 11A becomes entirely dark, the histogram moves to the left while maintaining the profile of the high level side thereof, as shown in FIG. 11B. In particular, the hatched area corresponding to the predetermined cumulative frequency is maintained. In other words, even if the entire brightness of the image is changed, the hatched area of the pixel regions determining the amplitude level indicated by the arrow, thus, determining the magnitude of the modulation level signal representing the region is maintained.

The modulation level calculator 110 determines the magnitude of the modulation level signal based on the high-frequency signal S2L obtained by the LOG conversion, and then, the level modulator 140 performs a coring process. Furthermore, by performing the inverse-LOG conversion of the resultant signal obtained from the process by the level modulator 140, the imaging apparatus obtains a linear FA signal S6 corresponding to the high-frequency signal S2 prior to the LOG conversion.

2-3. Advantages

As described above, in the embodiment, histogram processing is performed after the LOG conversion of the high-frequency signal extracted from the image signal, thereby further reducing the effect due to the brightness difference in an image when an FA signal is obtained. Thus, even if the brightness of the image is changed depending on a region, a threshold value for obtaining the FA signal can be properly set. Inverse-LOG conversion of the resultant signal obtained by a level modulation process such as a coring process can mitigate the amplitude of the original image signal to generate an FA signal. As a result, an image when it is highlighted can be sufficiently viewed.

Since the embodiments described above are intended to illustrate the techniques in the present disclosure, it is intended by the following claims to claim any and all modifications, substitutions, additions, and omissions that fall within the proper scope of the claims appropriately interpreted in accordance with the doctrine of equivalents and other applicable judicial doctrines.

The present disclosure is applicable to an imaging apparatus with a manual focus function. Specifically, the present disclosure is applicable to professional cameras, digital still cameras, movies, mobile phones with a camera function, smart phones, etc.

What is claimed is:

1. An imaging apparatus with a focus assist function, the apparatus comprising:
    an imager configured to obtain an image signal from a subject formed by a lens;
    a high-frequency signal extractor configured to extract a high-frequency signal from the image signal;
    a modulation level calculator configured to determine a magnitude of a modulation level signal in each of regions, into which a screen of the image signal is divided, in accordance with an amplitude level of the high-frequency signal;
    a level modulator configured to modulate the amplitude level of the high-frequency signal using the modulation level signal to obtain a focus assist signal; and
    a focus assist signal synthesizer configured to synthesize the focus assist signal with the image signal to output a resultant signal, wherein
    the level modulator performs a coring process for the amplitude level of the high-frequency signal using the modulation level signal as a continuously varying threshold value, thereby obtaining the focus assist signal.

2. The apparatus of claim 1, wherein
    the modulation level calculator produces a histogram of an amplitude level of the high-frequency signal in each of the regions to determine a magnitude of the modulation level signal in accordance with a cumulative frequency of the histogram.

3. The apparatus of claim 2, wherein
    the modulation level calculator adopts an amplitude level at which a cumulative frequency accumulated from a higher amplitude level of the histogram reaches a predetermined cumulative frequency as a magnitude of the modulation level signal representing a corresponding one of the regions.

4. The apparatus of claim 1, further comprising
    a modulation level two-dimensional interpolator between the modulation level calculator and the level modulator, the modulation level two-dimensional interpolator configured to perform two-dimensional interpolation of the modulation level signal in each of the regions.

5. The apparatus of claim 4, further comprising
    a block memory between the modulation level calculator and the modulation level two-dimensional interpolator, the block memory configured to temporarily memorize the modulation level signal in each of the regions.

6. The apparatus of claim 1, further comprising:
    a logarithm converter configured to perform logarithm conversion of an absolute value of the high-frequency signal and supply a high-frequency signal obtained by the logarithm conversion to the modulation level calculator and the level modulator; and
    an inverse-logarithm converter configured to perform inverse-logarithm conversion of the focus assist signal and supply a focus assist signal obtained by the inverse-logarithm conversion to the focus assist signal synthesizer.

* * * * *